US007327981B2

(12) United States Patent
Hundal

(10) Patent No.: US 7,327,981 B2
(45) Date of Patent: Feb. 5, 2008

(54) SYSTEMS AND METHODS FOR USING LANDLINE TELEPHONE SYSTEMS TO EXCHANGE INFORMATION WITH VARIOUS ELECTRONIC DEVICES

(75) Inventor: Sukhdeep S. Hundal, Delta (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 493 days.

(21) Appl. No.: 10/790,809

(22) Filed: Mar. 3, 2004

(65) Prior Publication Data
US 2005/0197061 A1 Sep. 8, 2005

(51) Int. Cl.
H04B 7/00 (2006.01)
(52) U.S. Cl. ................. 455/41.2; 455/41.3; 455/426.1; 455/462
(58) Field of Classification Search ............... 455/41.2, 455/74.1, 41.3, 426.1, 426.2, 552.1, 462, 455/553.1, 465
See application file for complete search history.

(56) References Cited

U.S. PATENT DOCUMENTS

| 6,018,672 | A | 1/2000 | Werbus |
| 6,650,871 | B1 | 11/2003 | Cannon et al. |
| 6,937,854 | B2* | 8/2005 | Janssen et al. ............... 455/416 |
| 2002/0160791 | A1 | 10/2002 | Markowitz |
| 2003/0045235 | A1 | 3/2003 | Mooney et al. |
| 2003/0142631 | A1 | 7/2003 | Silvester |
| 2003/0157929 | A1 | 8/2003 | Janssen et al. |
| 2003/0236091 | A1 | 12/2003 | Wonak et al. |
| 2004/0072544 | A1* | 4/2004 | Alexis ........................ 455/74.1 |
| 2004/0132447 | A1 | 7/2004 | Hirschfeld et al. |
| 2004/0266349 | A1 | 12/2004 | Wang |
| 2005/0085262 | A1 | 4/2005 | Underwood |

2005/0136839 A1* 6/2005 Seshadri et al. ........... 455/41.2

(Continued)

FOREIGN PATENT DOCUMENTS

GB 2 365 266 2/2002

(Continued)

OTHER PUBLICATIONS

UK search report dated Jun. 7, 2005.

(Continued)

Primary Examiner—Nay Maung
Assistant Examiner—Tuan H. Nguyen
(74) Attorney, Agent, or Firm—Paul Hastings Janofsky & Walker, LLP

(57) ABSTRACT

Systems and methods for wireless communications between at least one electronic device and a landline telephone. A system includes at least one electronic device in communication with a cordless telephone base station. In the preferred embodiment in which BLUETOOTH standards are used, each of the cordless telephone base station and the at least one electronic device includes a BLUETOOTH radio transceiver, so that the at least one electronic device can communicate with the base station using BLUETOOTH communications protocol. The cordless telephone base station also includes a cordless radio transceiver to communicate, using cordless radio frequency communications, with at least one cordless handset. The BLUETOOTH radio transceiver and the cordless radio transceiver of the cordless telephone base station are coupled so that a user can use cordless handsets to exchange messages, including audio, video and data, with the at least one electronic device through the control of the telephone base station.

40 Claims, 5 Drawing Sheets

U.S. PATENT DOCUMENTS

2005/0197061 A1    9/2005    Hundal

FOREIGN PATENT DOCUMENTS

| GB | 2 366 131 | * | 2/2002 |
| GB | 2 406 015 | | 3/2005 |
| WO | WO 00/04732 | | 1/2000 |
| WO | WO 01/50618 | | 7/2001 |
| WO | WO 2005/032109 | | 4/2005 |

OTHER PUBLICATIONS

GB Search Report Dated Jun. 11, 2004.

* cited by examiner

SYSTEMS AND METHODS FOR USING LANDLINE TELEPHONE SYSTEMS TO EXCHANGE INFORMATION WITH VARIOUS ELECTRONIC DEVICES

BACKGROUND OF THE INVENTION

1. Field of the Invention

The present invention relates to communications systems. More particularly, the present invention relates to systems and methods for exchanging data and audio between landline telephones and various electronic devices.

2. Background

Many users own both cordless landline telephone and cellular telephone. There is a strong user desire to use cellular telephone services (e.g., to take advantage of free night and weekend calls) from the comfort of the home landline telephone. Other users want to use the handset of their cordless telephone to communicate with others via the wireless network of the cellular telephone. For example, a user may want to take an incoming call received by the cellular telephone using the cordless handset while the cellular telephone is charging in its docking station. As another example, the user may want to access or transfer data between the cellular telephone and his home telephone (e.g., access or copy the cellular address book into his home telephone).

Known systems that couple a cellular telephone to a landline telephone rely on a physical connection to exchange control information, data and audio. Problems with such systems include, for example, mechanical contour, physical connector, electrical, and protocol problems. With respect to mechanical contour, a cellular telephone cradle is required and this cradle must physically fit the cellular telephone. A physical connector matching the cellular telephone connector is required, and the exact electrical characteristics of each cellular telephone must be followed. With respect to protocol, the exact protocol and command set provided by the cellular telephone must be used. None of the above factors are standardized, and existing cellular telephones differ radically in the above attributes. Hardware (e.g. mechanical, electrical, and electronic) and software development is typically required to support new cellular telephones. In view of the foregoing, it can be appreciated that a substantial need exists for systems and methods that can advantageously provide for wireless communications between cellular telephones and landline telephones.

In addition to the landline telephone and cellular telephone, many users possess separate electronic devices at homes, such as wireless headsets, cameras, and other devices. These electronic devices do not communicate with telephones. That is, users control and use the devices independently of the telephone. Accordingly, it would be also appreciated that the systems and methods for providing wireless communications between the cellular telephone and the landline telephone can be extendable to the applications of wireless communications between the landline telephone and one or more additional electronic devices.

BRIEF SUMMARY OF THE INVENTION

Embodiments of the present invention relate to systems and methods for exchanging information between a cordless landline telephone and one or more electronic devices, including headsets, cellular telephones, cameras, baby monitor, PC, etc. For example, in an embodiment, a system of the invention includes a cordless telephone base station that includes a short-range wireless radio communications module, such as BLUETOOTH module, for controlling and communicating one or more cellular telephones, a BLUETOOTH headset and camera. In accordance with one embodiment of the present invention, a telephone base station employing a BLUETOOTH module is capable of supporting at least one BLUETOOTH profile for different applications. The telephone base station first activates a wireless communications network with the electronic devices via BLUETOOTH wireless technology. The activation establishes a master-slave relationship, in which the telephone base station functions as a master device that controls the communication with the electronic devices that function as slave devices. The base station can also function as a slave device, which is controlled by an electronic device that functions as a master device. In either case, before establishing the master-slave relationship, a link that allows the various devices to know each other has to be established. To do so, for example, in the context of BLUETOOTH, the master device is in a discovery mode, i.e., the master device transmits radio signals over a wireless radio link (e.g., 2.4 GHz) to discover the at least one slave device and automatically establishes a wireless communication therewith. A user willing to establish a connection with the master device from any other slave devices, such as a cellular phone, a BLUETOOTH camera, etc., can switch these devices into a discoverable mode so that the master device can discover the devices and establishes wireless connections therewith. The master device then exchange information with the at least one slave device according to the applications.

The cordless telephone base station includes a BLUETOOTH radio transceiver and a BLUETOOTH antenna, and each of the electronic devices include a BLUETOOTH radio transceiver and a BLUETOOTH antenna, so that the electronic devices can communicate with the base station using BLUETOOTH communications technology. The cordless telephone base station also includes a cordless radio transceiver, such as 2.4 WDCT or other cordless transceiver, and a cordless radio antenna so that the cordless telephone base station can also communicate with cordless handsets that include cordless radio transceivers and antennas using cordless radio frequency communications technology. The BLUETOOTH radio transceiver and the cordless radio transceiver of the cordless telephone base station are configured so that the cordless handset exchanges information with an electronic device that supports one of the BLUETOOTH profiles via the landline telephone base station.

According to one embodiment of the present invention, a landline telephone base station supports two transceivers, one for a cordless link to cordless telephone working in an ISM band such as 2.4 GHz WDCT, and the other for coreless/wireless connection to a BLUETOOTH enabled electronic device. A BLUETOOTH enabled electronic device connects a wireless connection with a landline telephone base station once the device is within a predetermined range from the landline telephone base station using BLUETOOTH short range wireless technology without a need for physically connecting between the electronic device and the landline telephone base station. The landline telephone of the invention is BLUETOOTH enabled with headset profile support. The headset profile is used to exchange audio (SCO connection). A serial link (ACL) connection is used to exchange data.

According to another embodiment of the present invention, a system for exchanging information between landline telephone and electronic devices is provided. The system includes a telephone base station having a first BLUE- TOOTH radio transceiver and a first cordless radio transceiver, wherein the telephone base station includes a BLUETOOTH module that supports one or more BLUETOOTH profiles. The system also includes at least one cordless handset having a second cordless radio transceiver configured to communicate with the first cordless radio transceiver of the base station using cordless radio frequency communications. The system also include an electronic device having a second BLUETOOTH radio transceiver configured to communicate with the first BLUETOOTH radio transceiver of the base station using BLUETOOTH radio frequency communications. The electronic device supports at least one of the one or more BLUETOOTH profiles so that information is exchanged between the electronic device and the at least one handset via the telephone base station.

Another embodiment of the present invention provides a base station for exchanging information with at least one electronic device. The base station includes a BLUETOOTH module that supports one or more BLUETOOTH profiles, and a BLUETOOTH radio transceiver for transmitting and receiving BLUETOOTH wireless signals to and from the an electronic device. At least one of the BLUETOOTH profiles is a profile that the electronic device supports, and the base station and the electronic device uses the common profile to exchange information with each other.

DETAILED DESCRIPTION OF THE INVENTION

Figure 1:
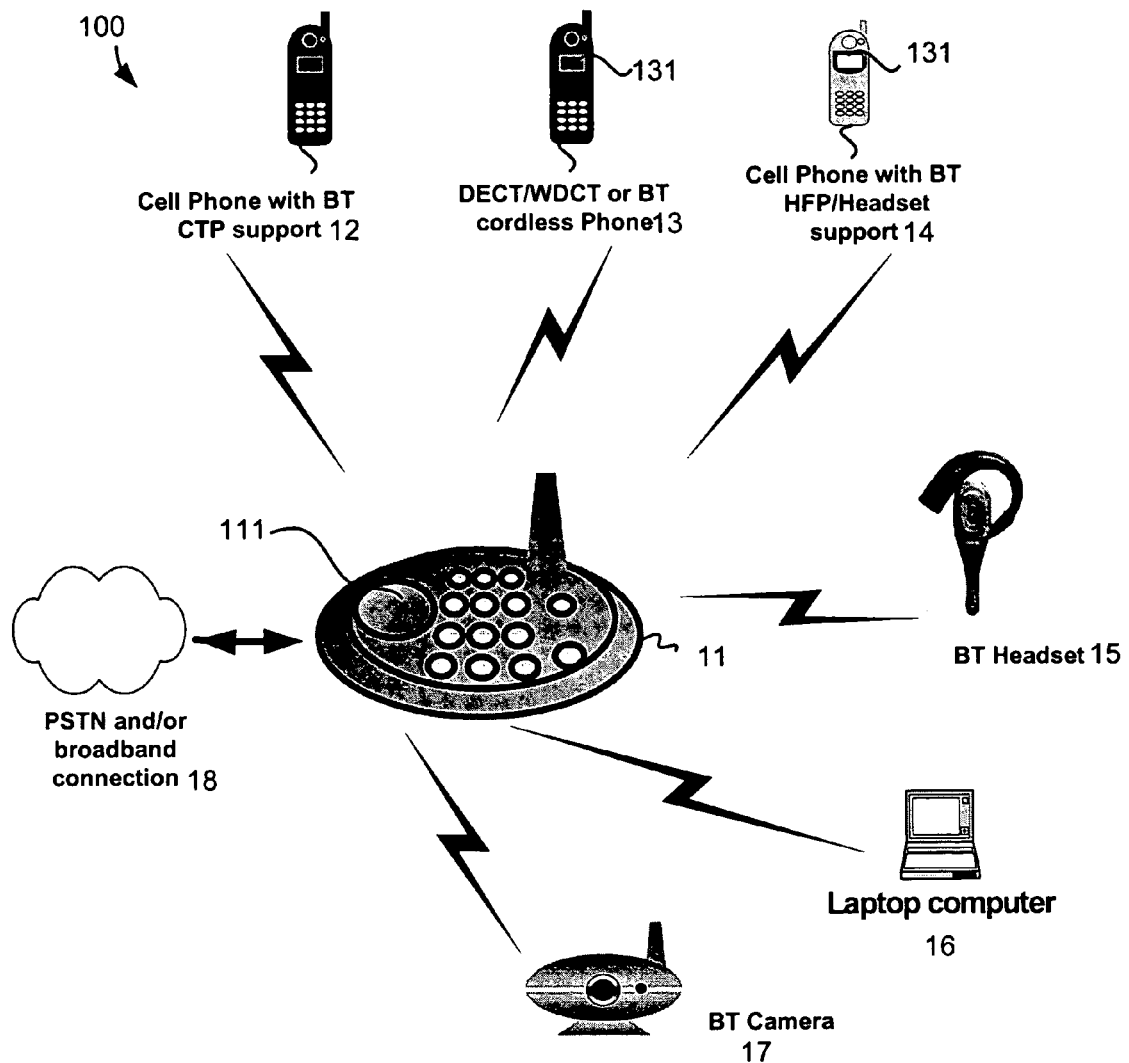
FIG. 1 shows a schematic diagram of an exemplary wireless communications system of the present invention in which a landline telephone base station exchanges information with a plurality of BLUETOOTH enabled electronic devices.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

According to an embodiment of the present invention, a system and/or method provides for exchanging information (e.g., data, audio, and/or video) between a landline telephone (e.g., corded telephone, cordless telephone, etc.) and a plurality of electronic devices (including cellular telephones, cameras, headsets, etc.) via BLUETOOTH short range wireless technology without a physical connection. Exemplary applications of the invention include using a landline telephone or a headset wirelessly connected to the landline telephone to make or receive telephone calls via a cellular telephone network. Other applications of the present invention include using cordless or corded telephone (home telephone) to make or receive a call on the cellular telephone, exchanging data (e.g., call logs, phone books, Caller Identification ("CID"), call waiting indicators and identifiers, message waiting indication such as voicemail in wireless mail box or SMS indication, etc.) between the landline telephone and the cellular telephone. Additional applications include, for example, accessing, using the landline telephone, cellular communication services (e.g., message mailboxes), receiving video data from a still or video camera (e.g., serving as baby camera) or a computer, and so on. For example, a BLUETOOTH camera can take a picture and send it to the landline telephone base station. The picture then can be sent from the telephone base station to a personal computer (PC) over a BLUETOOTH link or a USB etc., or to the cordless handset over a WDCT or other cordless link. In some cases, the cordless link can also be a BLUETOOTH link. Persons of skill in the art can appreciate further applications of the invention based upon the disclosure provided herein.

The invention, in a preferred embodiment, uses BLUETOOTH wireless technology to link a plurality of electronic devices to a landline telephone (e.g., residential telephone, etc.) for the purpose of exchanging information (e.g., audio and/or video data, any other data such as phone book, etc.) between the landline telephone and the plurality of electronic devices. The landline telephone base includes a BLUETOOTH module that supports various BLUETOOTH profiles for different applications. For example, the telephone base station can exchange information with a cellular telephone that wirelessly communicates with the telephone base station automatically and manually while being within a BLUETOOTH communications range. In this manner, the landline telephone can use standard GSM and/or CDMA AT commands to exchange data and manage incoming and outgoing cellular calls. BLUETOOTH technology is used for the connection between the cellular telephone and the landline telephone base station. For example, a BLUETOOTH communications subsystem and a cordless telephone subsystem can be integrated within one landline telephone system. An audio router can combine one or more calls from a cellular network coming over the cellular telephone and one or more PSTN calls over land line into one conference call.

Systems and method for exchanging audio and data between a landline telephone and one or more cellular telephones have been described in the commonly owned U.S. patent application Ser. No. 10/620,566, filed on Jul. 17, 2003, and entitled "systems and methods for exchanging data and audio between cellular telephones and landline telephones", which is incorporated herein by reference in its entirety.

In accordance with the present invention, the base station of the landline telephone includes a BLUETOOTH module that is capable of supporting different BLUETOOTH profiles to communicate with different devices. By using such a landline telephone, the user can use the landline telephone to receive/make calls associated with a cellular telephone of a wireless network, or use a BLUETOOTH-enabled headset to receive/make calls for a cellular telephone bypassing handsets of the landline telephone, or communicates with a BLUETOOTH-enabled camera for baby monitoring or surveillance, etc. Furthermore, a cellular telephone that supports BLUETOOTH cordless telephony profile (CTP) can also be used by the user to receive/make calls of the landline telephone when the cellular telephone is within a communicable range of the base station.

An exemplary multi-functional landline telephone system 100 is shown in FIG. 1. As shown, base station 11 includes a BLUETOOTH module that supports wireless communications with one or more of first cellular telephone 12, cordless handset 13, second cellular telephone 14, headset 15, computer 16, BT camera 17, and PSTN and/or broadband connection 18. All of the above devices are preferably BLUETOOTH-enabled and support BLUETOOTH profiles. For example, computer 16 can have built-in or external BLUETOOTH dongle. Other wireless standards and protocols may be used. BLUETOOTH wireless communications between base station 11 and these devices 12-17 can be established once the electronic devices are within the range of BLUETOOTH wireless communications. In accordance with the present invention, establishments of BLUETOOTH wireless communications can be done manually (i.e., with user intervention) or automatically.

Before establishing BLUETOOTH wireless connections with various devices as shown in FIG. 1, it is necessary for base station 11 to employ a BLUETOOTH transport method to activate a BLUETOOTH cell or "pico cell" (personal-area cell) with each of the BLUETOOTH-enabled devices. In a preferred embodiment of the present invention, base station 11 functions as a master device and devices 12-17 function as slave devices. Therefore, exchanges of information (e.g., one or more of video, audio and data) between base station 11 and devices 12-17 are controlled by base station 11. According to the BLUETOOTH transport method, base station 11 communicates with devices 12-17 in their unique respective time slots. In this manner, the communications between base station 11 and different devices, such as cellular telephone 12 and BLUETOOTH headset 15, will not be interrupted by each other. As is known in the art, a BLUETOOTH wireless technology is a short-range radio-frequency (RF) standard that has been developed for enabling various types of electronic devices to be connected without wires, cables or any direct intervention by a user. Once a BLUETOOTH connection is activated between base station 11 and the BLUETOOTH-enabled electronic devices, base unit 11 and these devices can automatically or manually communicate with each other via BLUETOOTH wireless technology every time without further activation. For example, an application program on camera 17 might take a number of pictures per second and automatically transfer these pictures to base unit 11, and base unit 11 then further automatically transfers these pictures to computer 16 or cordless handset 13.

The activation of the BLUETOOTH cell is well-known. Each of the BLUETOOTH-enabled devices includes a BLUETOOTH transmitter communicating at 2.4 GHz and a receiver for receiving signals transmitted from other devices. BLUETOOTH transmitters utilize a technique known as "spread-spectrum frequency hopping." With this technique, a device uses different frequencies at different time for communication, for example, BLUETOOTH standard uses distinct, randomly selected frequencies within a designated range, changing from one to another on a regular basis. For BLUETOOTH communications, the transmitter changes frequencies, approximately 1,600 times per second between channels.

In the same manner, other devices that operate in the vicinity of the landline telephone also may be pre-configured to establish a network among themselves. Generally, when BLUETOOTH-enabled devices are located within a short range of base station 11, an electronic "conversation" may occur for determining whether the devices are to share information, or whether one will control operations of another. Such communications occur automatically without user intervention. Once communication has occurred, the devices establish a network, regardless of whether the communicating devices are of a different type, or have different functions or capabilities. The network that is established can be referred to as a "personal-area network" (PAN) or a "piconet." Once the piconet is established, the hopping frequency is coordinated between the communicating devices, such that the devices can remain in communication and avoid other piconets that may operate in the same room.

With reference to FIG. 1, cellular telephone 12 preferably includes CTP (Cordless Telephone Profile), which allows a user to use cellular telephone 12, when it is within the communicable range of base station 11, to receive/place landline calls intended for the landline telephone. In other words, cellular telephone 12 is used to receive/place calls via base station 11 when it is within the range of base station 11. Furthermore, cordless handset 13 and cellular telephone 14 with BT HFP/headset support can receive commands from base station 11 for information exchange. An application can be written for phone book synchronization between cordless handset 13 and cellular telephone 14. In such implementation, whenever cellular telephone 14 comes within the range of base station 11, the phone book synchronization is initiated automatically without the user being aware of it. Alternatively, the phone book synchronization can be initiated by the user, i.e., the user activates the phone book synchronization through a menu to start the process. As described above, when cellular telephone 14 is within the communication range of base station 11, a wireless communication is established between base station 11 and cellular telephone 14. Base station 11 then exchanges information with cordless handset 13 and cellular telephone 14 so that a user can use cordless handset 13 to receive/places calls intended for cellular telephone 14. Base station 11 can also establish a wireless communication with BLUETOOTH-enabled headset 15 to allow the user to answer an incoming call or place a call using headset 15, bypassing cordless handset 13. For additional description, please refer to the commonly owned U.S. patent application Ser. No. 10/620, 566.

Furthermore, by means of the BLUETOOTH module built in base station 11, base station 11 can also connect wirelessly with BLUETOOTH-enabled computer 16 so that the user can use cordless handset 13 to exchange data with computer 16 and receive/place emails via computer 16 through the control of base station 11. In this case, cordless handset 13 and base station 11 may include displays 131 and 11, respectively, for displaying information. Similarly, base station 11 can be wirelessly connected to BLUETOOTH-enabled camera 17 to enable cordless telephone 13 for surveillance or baby monitoring. For example, images captured by camera 17 can be displayed on display 131 of handset 13. Base station 11 can be further connected to an Internet by PSTN and/or broadband connection 18. By means of a proper BLUETOOTH profile or other BLUE- TOOTH-enabled devices, printing, synchronization of address book with PDA, and other functions can be performed.

In accordance with the present invention, the BLUETOOTH module in base station 11 can support various profiles for different applications. For examples, access of cellular telephone functions from cordless handset, e.g., handset 13, is based upon BLUETOOTH profiles supported by cordless base station 11 and cellular telephone 14. Access of cellular telephone functions and landline telephone functions from BLUETOOTH headset 15 is based on a hand-free or headset profile and BLUETOOTH profiles supported by headset 15 and base station 11. In addition to the above BLUETOOTH profiles, access of landline telephone functions from a cellular telephone, e.g., handset 12, is further based on cordless telephony profile supported by base station 11 and handset 12. Base station 11 also supports various profiles that can be used to communicate with devices other than cellular telephones, for example, camera 17, computer 16, etc. In a preferred embodiment of the invention, BLUETOOTH-enabled base station 11 goes into discovery mode often to discover other BLUETOOTH devices. It can then automatically set up a link with previously paired devices and make use of appropriate BLUETOOTH profile based upon the device/application it is communicating with. This is supported in a standard BLUETOOTH service discovery profile.

The purpose of a BLUETOOTH profile is to provide a clear description of how a full specification of a standard system should be used to implement a given end user function. The idea is to ensure interoperability among devices from various manufacturers at application level. The service discovery and application profile is supported by every BLUETOOTH device. The other profiles are optional, including, for example, a headset profile, a fax profile, a LAN access profile, a dial-up Networking profile, and an object exchange profile.

Several specific examples of using BLUETOOH base station 11 to control data, audio and video exchanges with various electronic devices are now described in details below. The present invention is not limited to these specific examples.

Figure 2:
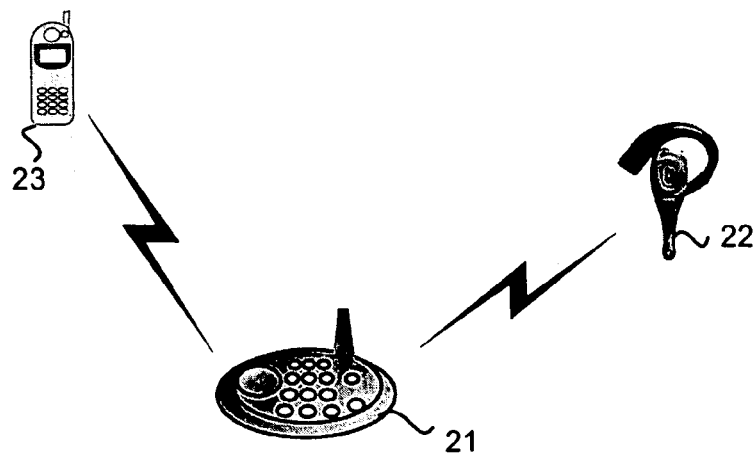
FIG. 2 is an exemplary embodiment of the present invention in which a base station controls data and audio exchange between a cordless handset and a BLUETOOTH headset.

FIG. 2 is an exemplary embodiment of the present invention in which base station 11 controls information (e.g., audio and data) exchange between cordless handset 23 and BLUETOOTH headset 22. According to the present invention, as base station 21 and BLUETOOTH headset 22 support the same profile, such as a headset profile, when a short-range RF wireless communication piconet is established between BLUETOOTH headset 22 and base station 21, base station 21 exchanges the information between cordless handset 23 and BLUETOOTH headset 22. Therefore, a user can use BLUETOOTH headset 22 to make and/or receive calls from/to base station 21 instead of cordless handset 23.

Figure 3:
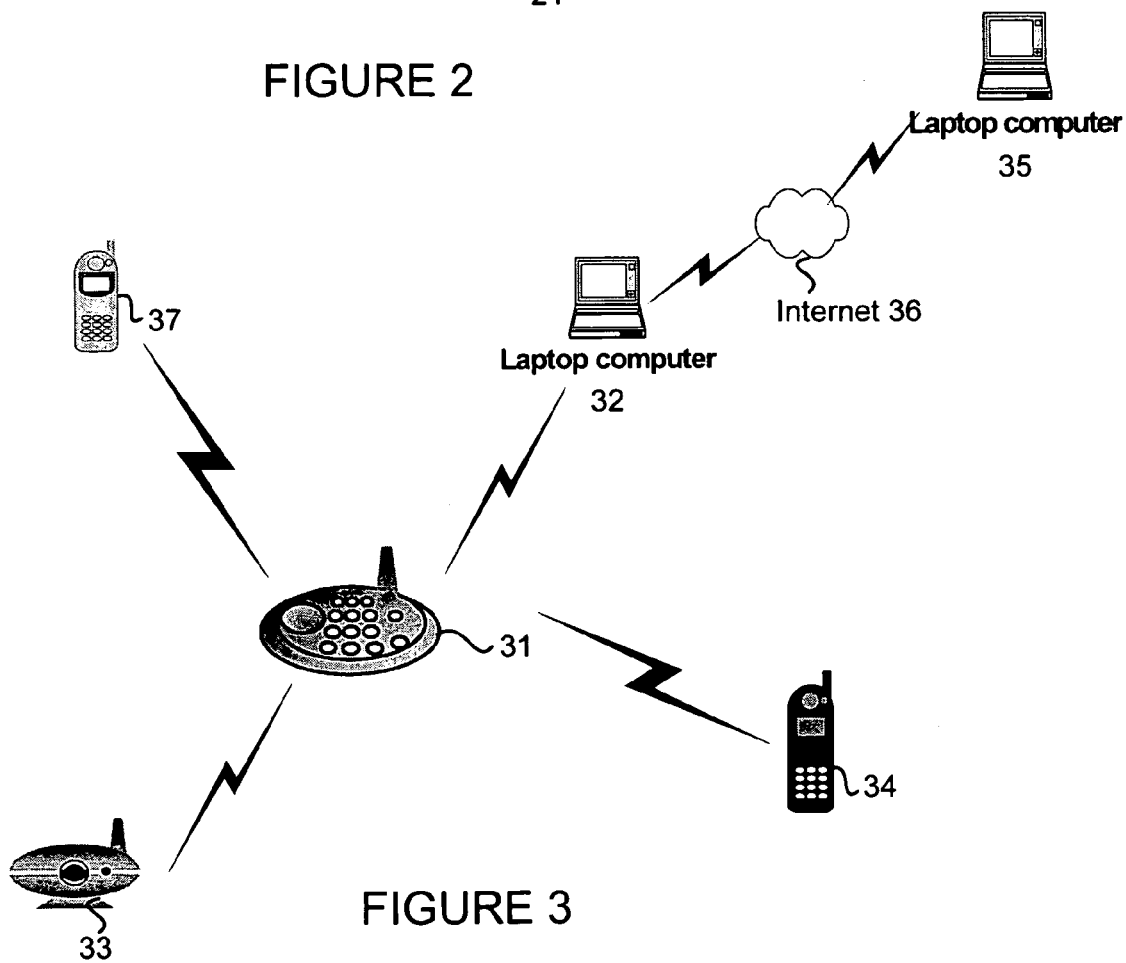
FIG. 3 is an exemplary embodiment of the present invention in which a base station controls data exchanges between a BLUETOOTH-enabled computer and a BLUETOOTH-enabled camera (e.g., a digital camera or a baby monitor).

FIG. 3 is an exemplary embodiment of the present invention in which base station 31 controls information exchanges between BLUETOOTH-enabled computer 32 and BLUETOOTH-enabled camera 33 (e.g., a video baby monitor). As described above, a short-range RF wireless communications piconet is automatically or manually established between base station 31, BLUETOOTH-enabled computer 32 and BLUETOOTH-enabled camera 33 when computer 32 and camera 33 is within the range of base station 31. With BLUETOOTH camera 33, a picture or live video can be transferred from camera 33 to base station 31. Base station 31 can then connect with BLUETOOTH-enabled computer 32 through USB or using a BLUETOOTH link or a proprietary cordless link to view the picture on computer 32. In some cases, base station 31 transfers the picture to cordless handset 34 using a proprietary cordless link in case that cordless handset 34 is not based upon the BLUETOOTH link.

BLUETOOTH-enabled computer 32 can also serve as a web server so that computer 32 can transmit the picture to remote PC 35 via Internet 36. In this case, the transmission of the pictures follows conventional Internet communications techniques. Similarly, it is also possible to retrieve pictures from BLUETOOTH-enabled computer 32 and send the pictures to base station 31. An application on computer 32 can convert these pictures into suitable formats for cordless handset 34 so that base station 31 can, after receiving the formatted pictures over a BLUETOOTH link, forwards the formatted pictures to cordless handset 34 over a proprietary link (when a BLUETOOTH link does not exist) or cellular telephone 37 over a BLUETOOTH link.

In another embodiment, the live video pictures taken by BLUETOOTH-enabled camera 33 and/or BLUETOOTH-enabled computer 32 can be also transferred to cellular telephone 37 making use of standard AT commands. The exchange of video and audio data will be described in details below. For additional information, please refer to the commonly owned U.S. patent application Ser. No. 10/620,566.

Figure 4:
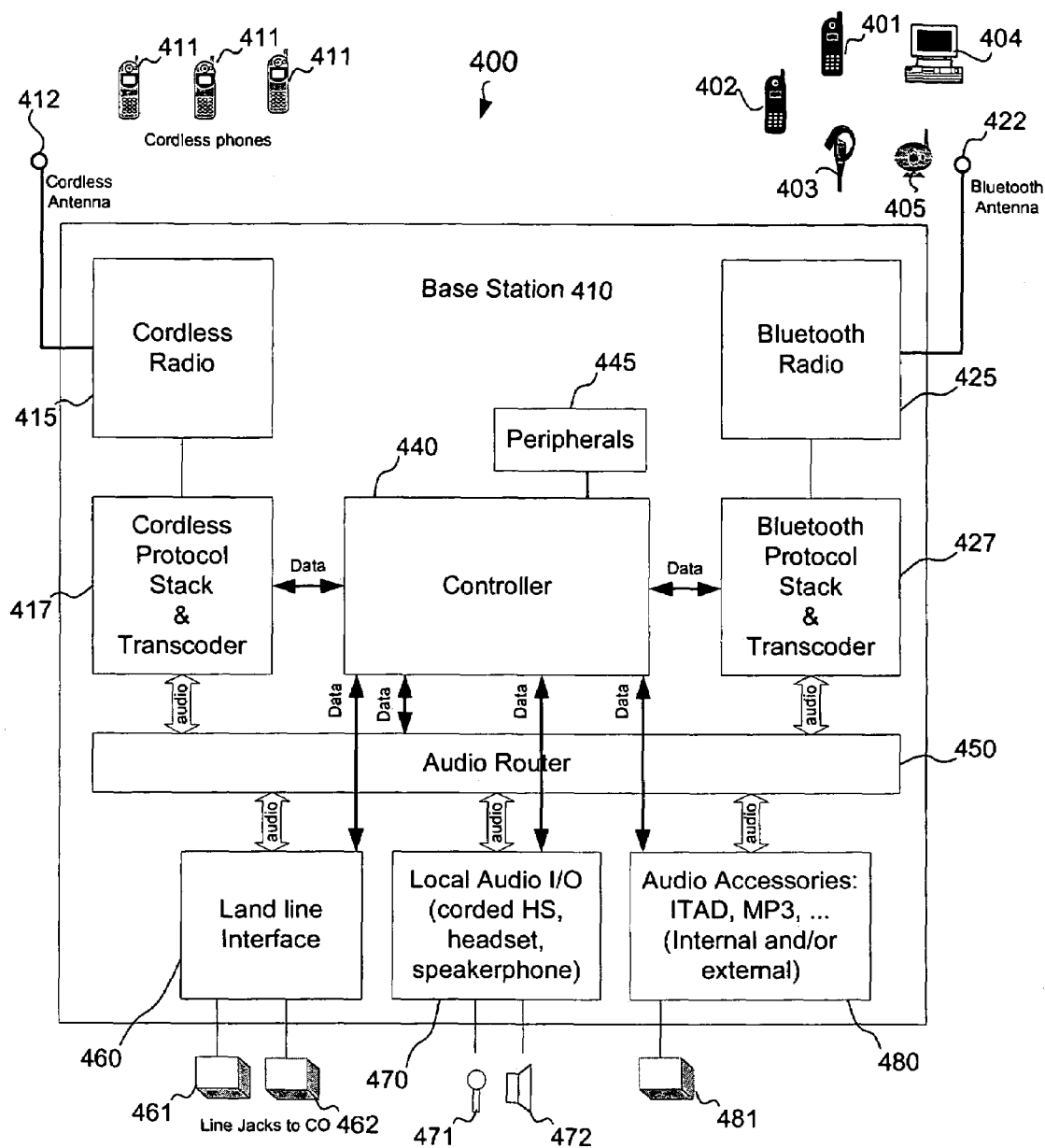
FIG. 4 shows a system diagram of an embodiment of the present invention for wireless communications between a landline telephone base station and one or more electronic devices.

A BLUETOOTH module that can support the BLUETOOTH headset profile deployed by the present invention is shown in FIG. 4. BLUETOOTH module 400 can be integrated with base station 11 (of FIG. 1), for example, in a BLUETOOTH protocol stack and transcoder. Please note that it is also possible that base station 11 is connected to a PC over BLUETOOTH or other wireless connection or hardware connection to support other applications.

FIG. 4 shows an exemplary system diagram of a base station in accordance with the present invention. Base station 410 is a fixed part of telephone set 400. Base station 410 supports two transceivers. One is cordless transceiver used for a cordless radio link, which includes cordless antenna 412 and cordless radio 415.

Base station 410 communicates with at least one cordless handsets 411 over the cordless radio link. Examples of the cordless radio link include a 2.4 GHz Worldwide Digital Cordless Telecommunications ("WDCT") link, a 900 MHz cordless link, a 5.8 MHz cordless link, and so on. Cordless radio 415 is coupled to cordless protocol stack and transcoder 417. The cordless protocol stack and transcoder 417 encompasses, for example, an Adaptive Differential Pulse Code Modulation ("ADPCM") to Pulse Code Modulation ("PCM") transcoder. Multiple cordless handsets 411 can be active simultaneously. The decoded audio from each active cordless handset can be sent to the Audio Router 450.

A second transceiver of base station 410 is a BLUETOOTH transceiver used for cordless/wireless radio link including BLUETOOTH antenna 422 and BLUETOOTH radio 425. With the BLUETOOTH transceiver, base station 410 exchanges information (e.g., one or more of data, video and audio) with at least one BLUETOOTH-enabled electronic devices, such as cellular telephones 401 and 402, headset 403, computer 404, and baby monitor 405 via the BLUETOOTH radio/wireless link. BLUETOOTH radio 425 of base station 410 is coupled to the BLUETOOTH Protocol Stack and Transcoder 427. An example of BLUETOOTH Protocol Stack & Transcoder 427 is a Continuously Variable Slope Delta ("CVSD") modulation to PCM transcoder. The decoded audio and data from the one or more cellular telephones is sent to Audio Router 450.

Audio Router 450 can setup multiple concurrent calls with two or more end points (e.g., a first cordless handset on a call over a first landline, a second cordless handset on a conference call with a base speakerphone and a second landline, both while an ITAD (Integrated Telephone Answering Device) is recording an incoming message from a cellular telephone).

Central controller 440 performs one or more tasks. For example, central controller 440 can (i) control the audio router to set up and end calls and conferences; (ii) control the local I/O devices (e.g., a keypad, a six-line LCD display, color graphic LCD display, etc.), data storage (e.g., telephone book, call logs, MMI parameters, etc); (iii) perform registration of remote devices (cordless and cellular); (iv) implement security services (recognizes, identifies and authenticates BLUETOOTH devices); and (v) support data exchange (e.g., remote access of address book and call logs, address book synchronization, processing of text messages, SMS from cellular to handset, games over cellular network, etc.). In an embodiment, central controller 440 includes a Digital Signal Processor ("DSP") coupled with an embedded microprocessor. Central controller 440 can also couple with peripherals 445 such as keypad, LCD, etc.

System 410 also can support a number of conventional landlines through landline interface 460, which can be coupled to a first line jack 461 to a central office ("CO") and a second line jack 462 to the same central office. Known 2.4 GHz cordless telephone systems include, for example, two and four line landline interfaces. Digitized audio from each telephone line coupled to line jacks 461, 462 is sent to Audio Router 450. Local Audio Input and Output (I/O) devices can also be connected to Audio Router 450 via Local Audio I/O interface 470. Examples of local audio devices that can be coupled to local audio I/O interface 470 include a speakerphone with microphone 471 and speaker 472, a corded headset, a wireless headset and adapter, and so on. For example, a known system such as the AT&T Model 2462 Two Line Corded/Cordless Answering System includes a speaker and microphone, headset jack, and corded handset. Base station 410 can also include an audio accessories interface 480 and an audio accessory port or connector 481. Examples of audio accessories that can be coupled to audio accessory interface 480 include an ITAD, an MP3 player, and so on.

In accordance with the present invention, communications between landline telephone base station 410 and a BLUETOOTH-enabled cellular telephone 402 that includes a BLUETOOTH transceiver (not shown) and a headset profile. There are many different profiles that can be supported by the BLUETOOTH protocol for different applications. However, a headset profile is currently the most widely supported by cellular telephones. Therefore, the embodiment of the present invention focuses on a headset profile to exchange data between landline telephone base station 410 and BLUETOOTH enabled cellular telephone 401, 402 that support the headset profile. Nevertheless, other profiles such as cordless telephone profile (CTP) and hand-free profile, can be also applied to the present invention. For examples, the CTP can be used by a cellular telephone, such as cellular telephone 401 to execute landline telephone functions. The hand free profile can be used by headset 403 to execute landline telephone functions and cellular telephone functions. Furthermore, landline telephone base station 410 can be a corded telephone base station that shares the BLUETOOTH profile. In this case, handsets 411 can be corded handsets.

Figure 5:
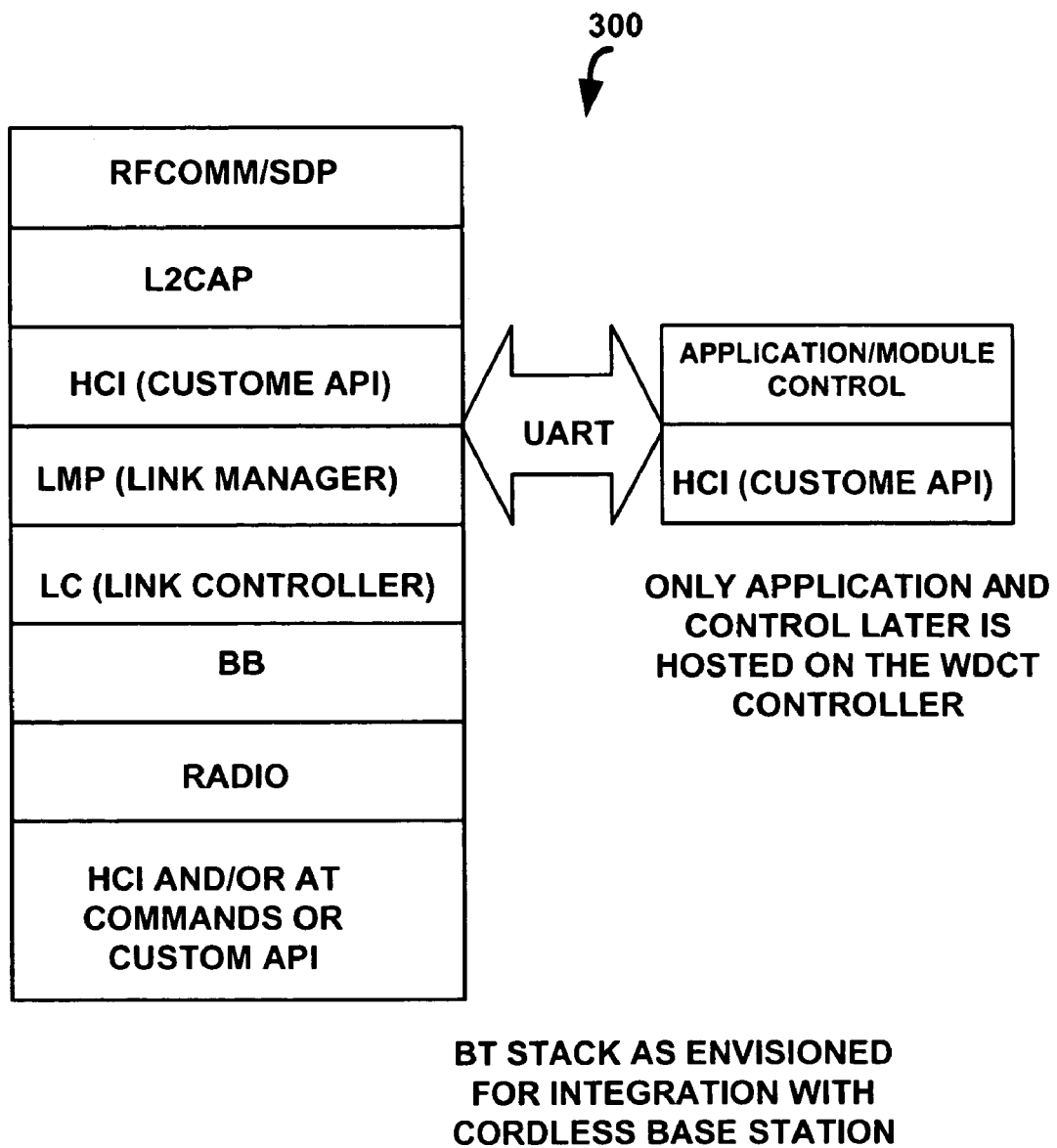
FIG. 5 shows a BLUETOOTH module to support a BLUETOOTH headset protocol for exchanging information between a BLUETOOTH enabled landline telephone and a BLUETOOTH enabled electronic device.

FIG. 5 shows the various components of the BLUETOOTH module, left hand side components (hardware and software) are embedded in a BT module/transceiver of the base station 410 while the right hand side is WDCT ASIC or a cordless part controller of base station 410. In such configuration, base station 410 controls BLUETOOTH module 500 using AT commands over Universal Asynchronous Receiver/Transmitter (UART). Whenever BLUETOOTH enabled devices (such as cellular telephone 402 and headset 403) are within the range of base station 410, a wireless connection is established between cellular telephone 402 and headset 403 and base station 410. As described above, the wireless connection can be established automatically or manually, depending on design. Once cellular telephone 402 connects with base station 410, base station 401 can use a standard GSM/CDMA AT commands over the BLUETOOTH link to manage incoming/outgoing calls over cellular telephone 402 and exchange data such as caller ID, address books, etc. GSM standard defines a set of standard AT commands to be provided by GSM cellular telephones. CDMA standard defines a set of standard AT commands to be provided by certain cellular telephone systems and some WLAN. As GSM and CDMA standards are well known in the art, further descriptions to GSM and CDMA standards are omitted.

A main application of the BLUETOOTH handset profile is to provide an audio link between an audio gateway and a handset. In accordance with the present invention, cellular telephone (standard configuration) is embedded with the audio gateway and a BLUETOOTH headset function is integrated in base station 410. The purpose of the BLUETOOTH headset function integrated with base station 410 is to facilitate exchange of audio and data between base station 410 and cellular telephone 402. In general, a BLUETOOTH handset profile supports an audio exchange but does not support a data exchange. Therefore, to manage the audio link to exchange audio and data between audio gateway and a headset (such as a cordless headset 411), in accordance with the present invention, a data link using ACL packets is first established between the audio gateway and the headset before the audio link is established by using Radio Frequency Commmunications and Service Discovery Protocol ("RFCOMM/SDP"). Via the ACL connection, a user can use landline headset such as handset 411 that communicates with base station 410 to exchange data with cellular telephone 402. The data link can be maintained in parallel with the audio link using ACL connection, but no packets switching is performed over the data link if there is no data transferred between landline telephone base station 410 and cellular telephone 402.

In accordance with the present invention, one feature of using the ACL-packet connection is that once the audio link is established, no additional radio resources will be used unless a data exchange between cellular telephone 402 and landline base station. 410 is initiated. That is,.the present invention utilizes the BLUETOOTH wireless communications to exchange data between cellular telephone 402 and landline base station 410 only when a user uses handset 411 of landline base station 410 to receive incoming calls for cellular telephone 402, to send outgoing calls on behalf of cellular telephone 402, or to access data stored in cellular telephone 402 such as telephone books. When no data exchange is needed, the ACL connection does not use any radio resources, but always remains present at logical level.

In addition, cellular telephone 402 supports AT commands over a physical serial port as well as an Infrared Data Association (IrDA) and BLUETOOTH interfaces. A serial port profile defines the requirements to provide emulation of a serial port over the Logical Link Control. BLUETOOTH specification explains the Serial Port Profile. Base station 410 uses a logical serial connection over a BLUETOOTH interface that exists between the audio gateway and the headset (but BLUETOOTH is embedded in base station 410). The audio gateway and the headset are two parts of the headset profile. The audio gateway is embedded in cellular telephone 402 and the headset part is embedded in landline telephone base station 410. They are used to exchange audio. Cellular telephone 402 responds to the AT commands over the BLUETOOTH interface that is handled by a control/application software on base station 410. In case an audio connection is already established between base station 410 and cellular telephone 402, an ACL connection will be used in parallel with an audio connection (SCO) or by muting the audio connection (SCO) link to send data packets over the SCO link. BLUETOOTH allows DM1 data packets (that are basic data packets used in BLUETOOTH profiles) to be sent over a SCO connection. In the case that there is no audio connection, an ACL connection will be established for exchange of data/AT commands to manage incoming and outgoing cellular calls from a landline cordless handset. Furthermore, in accordance with the present invention, if the ACL connection used for the handset or any other profile could not be used for AT commands exchange between the cordless base station and the cellular telephone, a SPP (Serial Port Profile, not shown) connection parallel with the ACL/SCO connection is set up to facilitate the AT command exchange.

The BLUETOOTH headset profile can also be applied to other electronic devices other than cellular telephones. For example, base station 410 establish a wireless communication link with headset 403 when headset 403 is within its BLUETOOTH communications range. Once they are connected, base station 410 uses a standard GSM/CDMA AT commands over the BLUETOOTH link and the ACL-packet connection to exchange audio and data with headset 405 so that the user can use headset 205 to receive and place calls for the landline telephone and to access data from the landline telephone. Base station 410 can also exchange audio and data between cellular telephone 402 and headset 405 bypassing handset 411. Thus, the user can use headset 405 to receive and make cellular telephone calls. Similarly, via the standard GSM/CDMA AT commands over the BLUETOOTH link and the ACL packet connections, base station 410 can exchange audio, video and data with baby monitor 405 or computer 404 and can display video data received from baby monitor 405 or computer 404 when baby monitor 405 or computer 404 is within its BLUETOOTH communications range.

As described above, to ensure interoperability among devices made by various manufacturers, the service discovery and application profile should be supported by every BLUETOOTH device. The other profiles are optional, including, for example, a headset profile, a fax profile, a LAN access profile, a dial-up Networking profile, and an object exchange profile. The key idea behind this concept is that it is possible that in one embodiment the base unit and various devices support all the profiles and there is an application level compatibility. However, all these device are based upon RFCOMM (serial profile), which they use for initial link (an ACL link is set up for communication between devices) set up before application level communication starts up. For example, in a headset profile, during the link setup, an ACL link associated with a RFCOMM is set up, the SCO link is set up second RFCOMM (port numbers).

Although ACL link is not used for voice communication, it could be used to communicate between the devices as long as the communication between the devices is based on standard commands. There are many commands which are standard for controlling or getting the information from the device under GSM and BLUETOOTH standard.

Similarly, if a device does not support a profile for a particular application, the base station can still get information from the device using the ACL link which is present in the background based upon standard AT (control commands) commands. Alternatively, if both the base station and the device are produced by one common manufacturer, non-BLUETOOTH compatibility can be implemented at an application level. That is, although the device may only support one application in the standard BLUETOOTH implementation, based on this concept, it is possible to create a cluster of applications or connectivity where the base station acts as an agent or agent between various devices.

Accordingly, embodiments of the present invention can advantageously provide wireless communications between one or more electronic devices and a landline telephone without a mechanical or physical communications connection to and from the one or more electronic devices. Because there is no mechanical or physical communications connection, the electrical characteristics of the physical electronic device control and communications interface can be irrelevant to embodiments of the present invention. Furthermore, an embodiment of the present invention operates as soon as the electronic devices are within a range (e.g., BLUETOOTH's RF range) of a BLUETOOTH receiver of a landline telephone base station. Therefore, even if, for example, the cellular telephone is left in a purse or a car, but as long as the purse or car is within the range, user can still use a landline telephone to make or receive cellular telephone calls via the cellular network associated with the cellular telephone.

Figure 6:
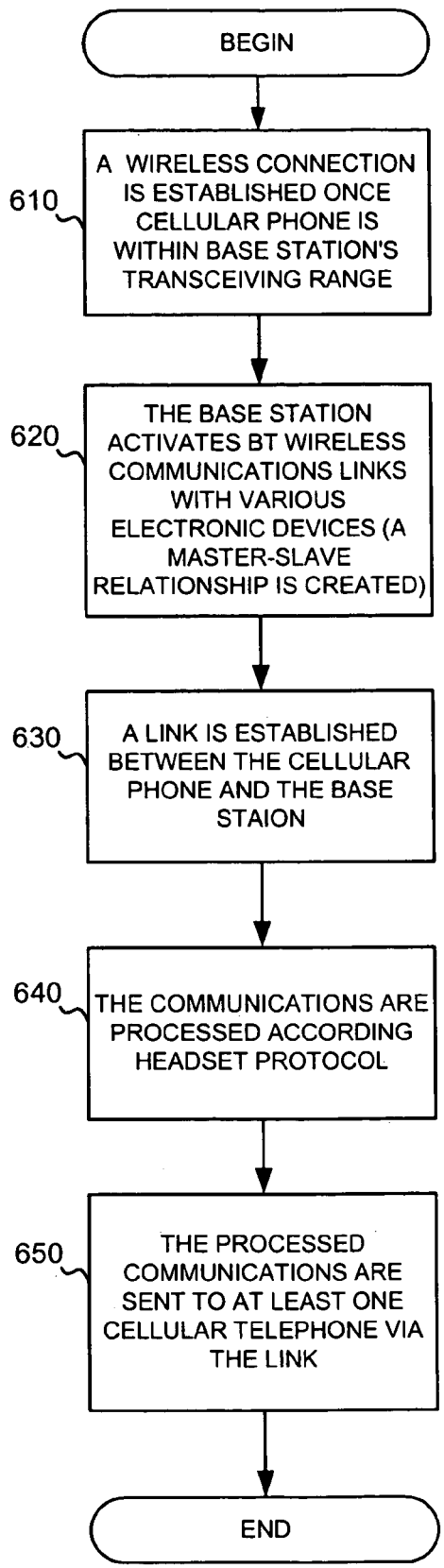
FIG. 6 shows an exemplary method in accordance with an embodiment of the present invention.

FIG. 6 shows a method in accordance with an embodiment of the present invention.

At step 610, a base station initiates and activates BLUETOOTH wireless communications links with various BLUETOOTH enabled electronic devices according to BLUETOOTH standards. After the initiation and activation, a master-slave relationship of the base station with the various electronic devices is established.

At step 620, wireless communication is established once one of the various electronic devices, e.g., a cellular telephone in the exemplary embodiment, is within a receiving range of the base station. In accordance with a preferred embodiment of the present invention, the base station goes to a discovery mode on a regular basis to discover other BLUETOOTH devices, automatically set up a link with previously paired device and makes use of appropriate BLUETOOTH profile based upon the device/application it is communicating with.

At step 630, an audio link is established between a gateway, with which the cellular telephone is embedded, and a headset function, which is integrated with a landline telephone base station. The link may be data only or data and audio depending upon the profile support. To support data exchange, a data link using ACL and SCO connections is also established between the gateway and the base station. The ACL connection is used for sending data packets and the SCO connection is used for sending audio packets. In alternative embodiment, some of the data packets can also be sent over the SCO connection. Audio and data communications are then received from a telephone handset of a telephone user.

At step 640, audio and/or data communications are processed according to an appropriate BLUETOOTH profile as described with reference to FIGS. 5. For example, audio communications can be processed according to a BLUETOOTH headset profile. Data communications can be processed through a data link using ACL packets according to a RFCOMM/SDP protocol. As mentioned above, an ACL link is required to establish and break audio connection such that once the audio link is established, a data and audio exchange between the cellular telephone and the base station is carried out via the audio link.

At step 650, the base station uses a connection over a BLUETOOTH interface to send AT commands to the cellular telephone by using the ACL connection. The cellular telephone also responds to AT commands over the BLUETOOTH interface. In an embodiment in which two or more cellular telephones are registered in the landline telephone base station, a cellular telephone identifier is received that identifies which cellular telephone should receive the processed audio communications.

While the above preferred embodiment of the present invention has been described with respect to a cellular telephone, embodiments of the present invention are not limited to only the cellular telephone. In an embodiment, mobile BLUETOOTH devices that communicate with base station include not only cellular telephones but also PDAs or other BLUETOOTH enabled devices for wireless communication. For example, the BLUETOOTH enabled PDAs, wireless e-mail devices, digital organizers, or PCs can store telephone related information, such as, for example, address book information. In accordance with embodiments of the present invention, the base station and/or the cordless handset can access the information stored in the BLUETOOTH enabled devices. Furthermore, while preferred embodiments of the present invention have been described as using BLUETOOTH communications, other wireless communications, such as 802.11 communications, or Infrared Data (IrDA) can be used. In addition, other wireless communication technologies, such as ZigBee or any other propriety wireless link can also be used.

In accordance with the present invention, a direct link between a cordless handset and a cellular telephone is also possible, provided that the BLUETOOTH module could be supported directly from the cordless handset. In this case, all the BLUETOOTH software and hardware are built in the handset.

In view of above, in accordance with the present invention, incorporating the BLUETOOTH module in base station 11 (FIG. 1) that supports a variety of BLUETOOTH profiles for enabling different application, base station 11 can be utilized to provide at least the following advantages over the prior art:

(1) Elimination of the need for a mechanical connection between a cellular telephone, a landline telephone and cordless handsets.

(2) Enablement for the user to make or receive cellular telephone calls on cordless handsets at home.

(3) Capability for the base station to communicate with BLUETOOTH-enable devices for different applications.

(4) Utilization of widely deployed standard BLUETOOTH wireless technology in cellular telephone to exchange audio and data, so that a large number of products can be supported with single development.

(5) Reduction of overall cost.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for exchanging information between landline telephone and electronic devices, the system comprising:
a telephone base station having a first short range radio frequency (RF) communications radio transceiver; and
at least two electronic devices each having a second short range RF communications radio transceiver configured to communicate with the first short range RF communications radio transceiver of the base station;
wherein the first and second short range RF communications radio transceivers are configured so that a first of the at least two electronic devices exchanges information with a second of the at least two electronic devices via the base station, and
wherein the first of the at least two electronic devices is configured to communicate with an external network using a separate communications link while the first of the at least two electronic devices is in communication with the telephone base station using the second short range RF communications radio transceiver.

2. The system of claim 1, wherein the at least two electronic devices are BLUETOOTH-enabled devices and each of the first and second short range RF communications radio transceivers is BLUETOOTH transceiver.

3. The system of claim 2, wherein one of the at least two electronic devices is a camera.

4. The system of claim 2, wherein one of the at least two electronic devices is a personal computer.

5. The system of claim 2, wherein one of the at least two electronic device is a cellular telephone.

6. The system of claim 1, wherein the base station further comprises a first cordless radio transceiver.

7. The system of claim 6, wherein one of the at least two electronic device is a cordless telephone handset that has a second cordless radio transceiver configured to communicate with the first cordless radio transceiver of the base station.

8. The system of claim 1, wherein the information includes one or more of data, video, and audio.

9. The system of claim 1, further comprising a short range RF communications module.

10. The system of claim 9, wherein the short range RF communications module establishes an audio link for exchanging audio messages between the at least two electronic devices.

11. The system of claim 9, wherein the short range RF communications module establishes a video link for exchanging video messages between the at least two electronic devices.

12. The system of claim 9, wherein the short range RF communications module establishes a data link for exchanging data between the at least two electronic devices.

13. The system of claim 1, wherein the first of the at least two electronic devices is a cellular telephone that is configured to perform one or more of receiving and sending information between the cellular telephone and an external cellular network using a long range radio transceiver.

14. The system of claim 1, wherein the first of the at least two electronic devices is a computer that is configured to perform one or more of receiving and sending information over a data network.

15. A system for wireless communications, comprising:
a base station including a first short range radio frequency (RF) wireless communications transceiver and a first cordless radio transceiver, wherein the telephone base station includes a short range RF communications module that supports one or more profiles;
a handset including a second cordless radio transceiver configured to communicate with the telephone base station; and
one or more electronic devices each including a second short range RF wireless communications transceiver configured to communicate with the first short range RF wireless communications transceiver of the base station, and
wherein when at least one of the one or more electronic devices is in a range of the first short range RF wireless transceiver of the base station, a wireless communication is established between the at least one of the one or more electronic devices and the telephone base station to exchange information between the at least one of the one or more electronic devices and the handset through the base station, and wherein the at least one of the one or more electronic devices is configured to communicate with an external network using a separate communications link while the at least one of the one or more electronic devices is in communication with the telephone base station using the second short range RF communications radio transceiver.

16. The system of claim 15, wherein the short range RF communications module is a BLUETOOTH module that supports one or more BLUETOOTH profile.

17. The system of claim 15, wherein a data link is established using an Asynchronous Connectionless Link (ACL) connection along with the audio link to support data exchange between the at least one of the one or more electronic devices and the telephone base station.

18. The system of claim 15, wherein the landline telephone is a landline corded telephone.

19. The system of claim 15, wherein the landline telephone is a landline cordless telephone.

20. The system of claim 15, wherein the at least one of the one or more electronic devices comprises a cellular telephone.

21. The system of claim 20, wherein the handset is used to receive incoming calls for the cellular telephone and to send outgoing calls on the behalf of the cellular telephone under the control of the base station.

22. The system of claim 15, wherein the telephone base station transmits radio signals in a hopping frequency to discover the at least one of the one or more electronic devices, wherein the telephone base station automatically establishes a wireless communication with the discovered electronic devices if the telephone base station has previously activated a connection with the discovered electronic devices.

23. The system of claim 15, wherein the telephone base station establishes a wireless communication with the at least one of the one or more electronic devices through a user intervention.

24. A telephone base station for exchanging information with one or more electronic devices, comprising:
a short range RF wireless communications module that supports one or more short range RF wireless communications profiles; and
a short range RF wireless communications radio transceiver for transmitting and receiving wireless signals to and from at least one of the one or more electronic devices;
wherein at least one of the one or more short range RF wireless communications profiles includes a profile that the at least one electronic device supports, and the base station and the at least one of the one or more electronic devices uses the common profile to exchange information with each other, and
wherein the at least one of the one or more electronic devices is configured to communicate with an external network using a separate communications link while the at least one of the one or more electronic devices is exchanging information with the telephone base station using the common profile.

25. The base station of claim 24, wherein the short range RF wireless communications module is a BLUETOOTH module that supports one or more BLUETOOTH profiles.

26. The base station of claim 24, further comprising a cordless radio transceiver for transmitting and receiving radio signals from a cordless handset, wherein the cordless radio transceiver and the short range RF wireless communications radio transceiver are coupled so that the base station can exchange information with one or more electronic devices by using the cordless radio transceiver.

27. The system of claim 26, wherein the one or more electronic devices includes a cellular telephone.

28. The system of claim 27, wherein the cellular telephone supports a cordless telephony profile.

29. The system of claim 28, wherein the electronic device includes a headset that supports at least one BLUETOOTH profile.

30. A method for exchanging messages between a landline telephone and an electronic device, the method comprising:
activating a wireless communication network with the electronic device through a short range RF wireless communications technology;
establishing a wireless communications link between the landline telephone and the electronic device when the electronic device is within a range of a transceiver of the landline telephone;
establishing a message communications link between the electronic device and the landline telephone;
exchanging information between the electronic device and the landline telephone according to a short range RF wireless communications profile supported by both of the electronic device and the landline telephone; and establishing a communications link between the electronic device and an external network, wherein the electronic device is configured to send and receive information over the external network while the message communications link is active between the electronic device and the landline telephone, and wherein the landline telephone, after receiving information from the electronic device, further transmits the received information to another electronic device that is wirelessly in communication with the base station.

31. The method of claim 30, further comprising:

establishing a data link using Asynchronous Connectionless Link (ACL) connection between the electronic device and the landline telephone for supporting data exchanges between the electronic device and the another electronic device.

32. The method of claim 30, further comprising establishing an audio link between the landline telephone and the electronic device when the wireless communications link between the landline telephone and the electronic device is established.

33. The method of claim 30, wherein the one electronic device, the another electronic device, and the landline telephone are all BLUETOOTH-enabled.

34. The method of claim 30, wherein the landline telephone comprises two transceiver, one of which is a cordless link transceiver for use in receiving/sending messages to at least one landline handset, and the other one of which is a BLUETOOTH transceiver for use in receiving/sending messages to the electronic device.

35. The method of claim 30, wherein after the message communications link is established, the landline telephone exchanges the messages with the electronic device by using the at least one landline handset.

36. The method of claim 30, wherein the message communications link includes an audio link and the messages exchanged between the landline telephone and the electronic device via the audio link includes AT commands.

37. The method of claim 36, wherein the AT commands are sent using data packets over an ACL (Asynchronous Connectionless link) connection.

38. The method of claim 37, wherein the AT commands are sent using one of the audio packets, the data packets, and a combination of audio packets and data packets.

39. The method of claim 36, wherein the AT commands are sent using data packets over an audio (SCO) connection.

40. The method of claim 30, wherein the messages include data, audio messages and video messages.

* * * * *